(12) United States Patent
Li

(10) Patent No.: US 7,903,237 B1
(45) Date of Patent: Mar. 8, 2011

(54) LASER RANGEFINDER WITH A VOICE CONTROL FUNCTION

(76) Inventor: Nen-Tsua Li, Taichung (TW)

( * ) Notice: Subject to any disclaimer, the term of this patent is extended or adjusted under 35 U.S.C. 154(b) by 42 days.

(21) Appl. No.: 12/540,509

(22) Filed: Aug. 13, 2009

(51) Int. Cl.
 *G01C 3/08* (2006.01)
(52) U.S. Cl. .......................................... 356/5.01
(58) Field of Classification Search .................. 356/4.01, 356/5.01
 See application file for complete search history.

(56) References Cited

U.S. PATENT DOCUMENTS

| | | | |
|---|---|---|---|
| 5,926,260 A * | 7/1999 | Dunne et al. ................. | 356/5.05 |
| 7,221,435 B2 * | 5/2007 | Stierle et al. ................. | 356/4.01 |
| 7,508,497 B2 * | 3/2009 | LaBelle ....................... | 356/5.01 |
| 7,564,537 B2 * | 7/2009 | Stierle et al. ................. | 356/4.01 |
| 7,733,077 B1 * | 6/2010 | Merewether et al. .......... | 324/67 |
| 2007/0182950 A1 * | 8/2007 | Arlinsky ...................... | 356/5.01 |
| 2008/0266541 A1 * | 10/2008 | Yung et al. .................... | 356/4.01 |
| 2010/0225896 A1 * | 9/2010 | Wolf et al. ................... | 356/4.01 |
| 2010/0228517 A1 * | 9/2010 | Wike et al. .................... | 702/149 |

\* cited by examiner

*Primary Examiner* — Isam Alsomiri
(74) *Attorney, Agent, or Firm* — patenttm.us

(57) ABSTRACT

A laser rangefinder with a voice control function has a housing, a voice sensor module, a measure module, a circuit board and a display module. The housing has a voice-receiving hole and a screen. The voice sensor module receives voice commands through the voice-receiving hole. The measure module produces and emits a laser beam toward an object and then receives the laser beam reflected from the object. The circuit board judges the voice command sent by the voice sensor module to activate the measure module for calculating and determining a distance between the laser rangefinder and the object based by a time interval of the laser beam traveling toward and returning from the object. The display module shows a determined result on the screen.

2 Claims, 5 Drawing Sheets

LASER RANGEFINDER WITH A VOICE CONTROL FUNCTION

BACKGROUND OF THE INVENTION

1. Field of the Invention

The present invention relates to a distance-determination apparatus, and more particularly to a laser rangefinder with a voice control function.

2. Description of Related Art

A conventional laser rangefinder uses a laser beam to determine a distance of a reflective object. The distance is determined by a time interval of a laser beam emitted by the laser rangefinder traveling toward and returning from the object. However, because the conventional laser rangefinder is controlled manually, a functional button must be pressed on the laser rangefinder to operate the rangefinder. However, pressing the buttons causes vibration to pass through the conventional rangefinder and causes miscalculation or inaccuracy, even when mounted on a tripod.

Further, when the laser rangefinder is operated in a confined space, the functional buttons may be inaccessible or awkward, so the conventional laser rangefinder is inconvenient in use.

To overcome the shortcomings, the present invention tends to provide a laser rangefinder with a voice control function to mitigate and obviate the aforementioned problems.

SUMMARY OF THE INVENTION

The main objective of the invention is to provide a laser rangefinder with a voice control function. Voice commands are given to improve convenience and accuracy of the laser rangefinder.

A laser rangefinder with a voice control function has a housing, a voice sensor module, a measure module, a circuit board and a display module. The housing has a voice-receiving hole and a screen. The voice sensor module receives voice commands through the voice-receiving hole. The measure module produces and emits a laser beam toward an object and then receives the laser beam reflected from the object. The circuit board judges the voice command sent by the voice sensor module to activate the measure module for calculating and determining a distance between the laser rangefinder and the object based by a time interval of the laser beam traveling toward and returning from the object. The display module shows a determined result on the screen.

Other objects, advantages and novel features of the invention will become more apparent from the following detailed description when taken in conjunction with the accompanying drawings.

DETAILED DESCRIPTION OF PREFERRED EMBODIMENT

Figure 1:
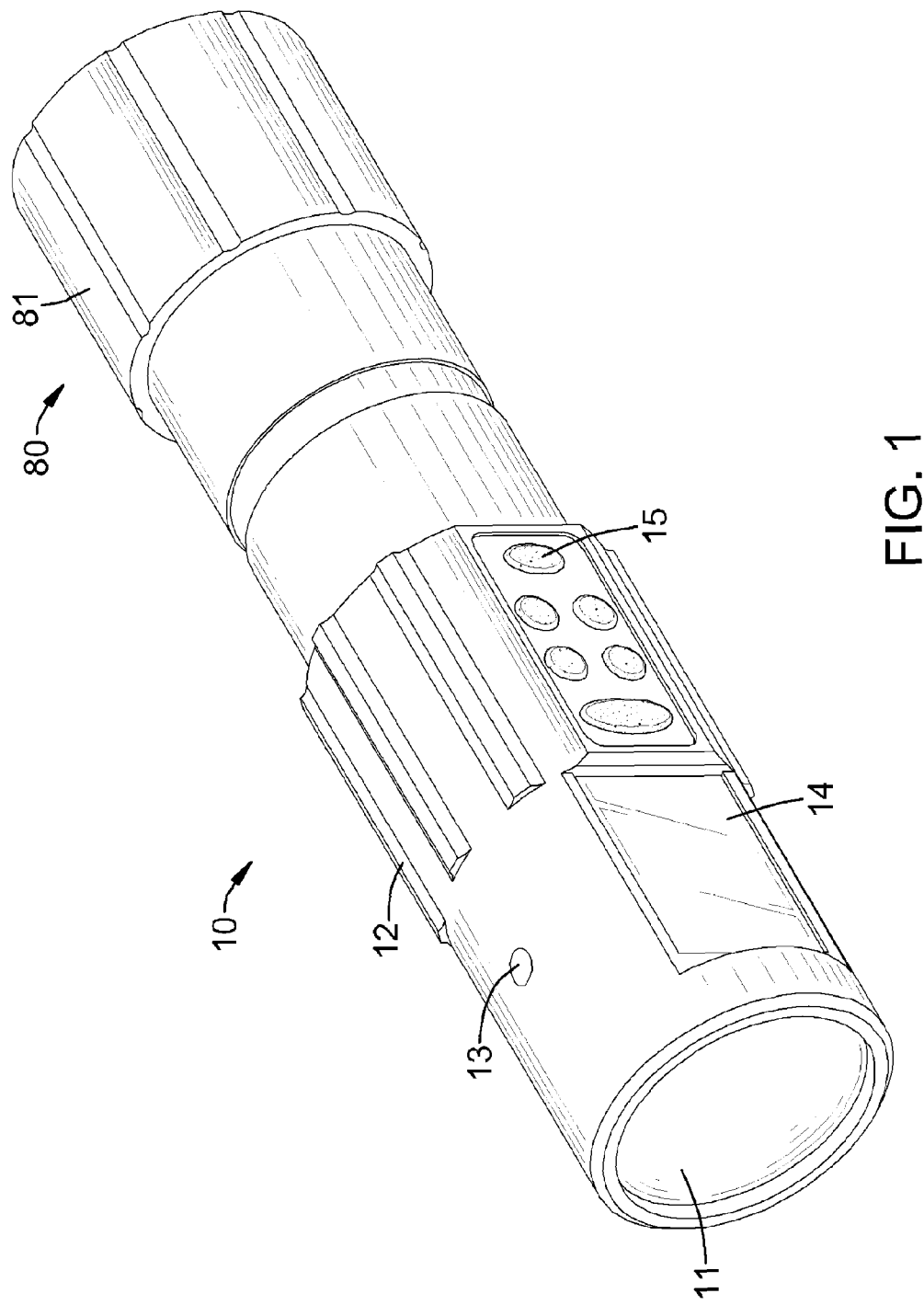
FIG. 1 is a perspective view of a laser rangefinder in accordance with the present invention.
Figure 2:
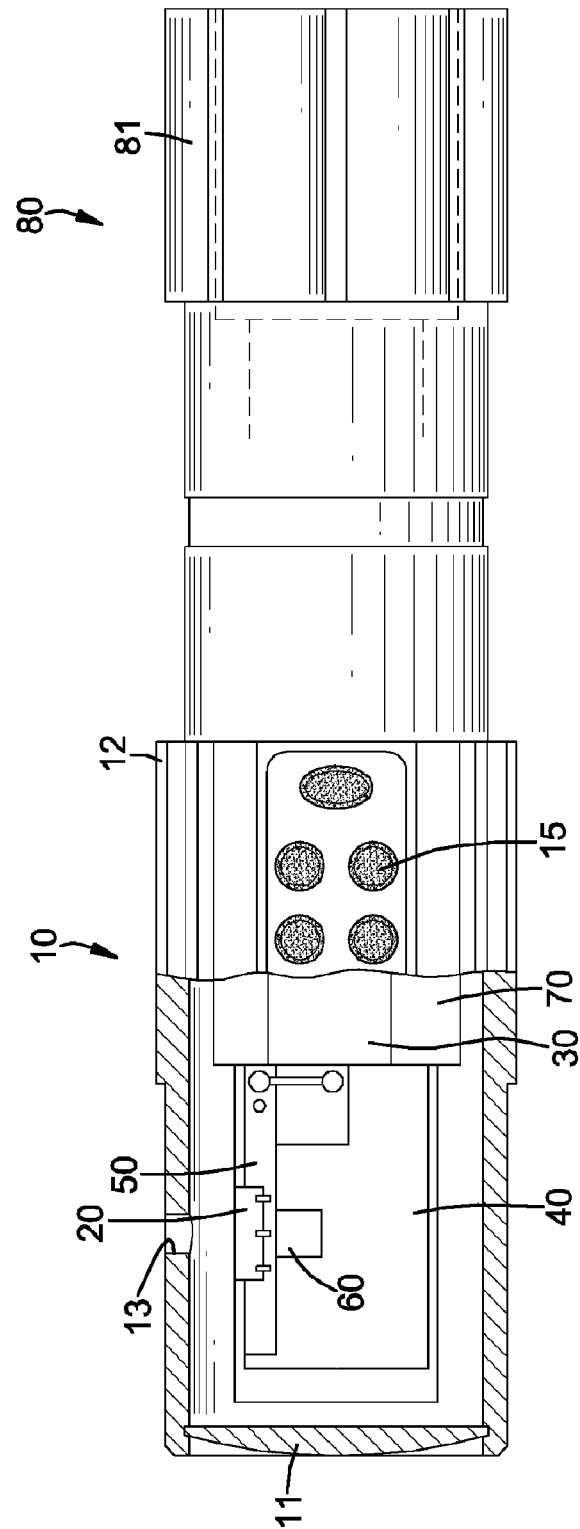
FIG. 2 is a side view in partial section of the laser rangefinder in FIG. 1.

With reference to FIGS. 1 and 2, a laser rangefinder in accordance with the present invention comprises a housing (10), a voice sensor module (20), a manual input module (30), a measure module (40), a circuit board (50), a display module (60), a power module (70) and an illumination module (80).

Figure 3:
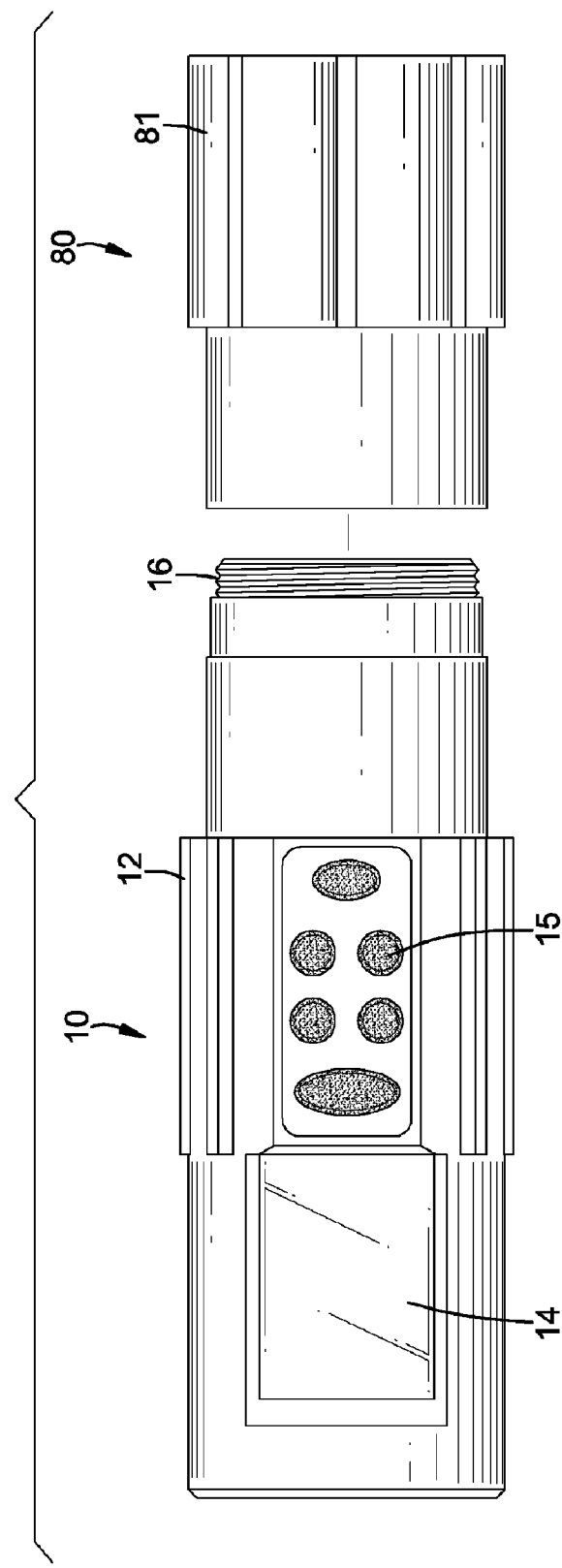
FIG. 3 is an exploded side view of the laser rangefinder in FIG. 1, wherein the body is separated from the housing.

With further reference to FIG. 3, the housing (10) is hollow and cylindrical and has an outer surface, an inner surface, a front end, a middle, a rear end, a lens (11), multiple ribs (12), a voice-receiving hole (13), a screen (14), multiple functional buttons (15) and a threaded section (16). The lens (11) is mounted securely in the inner surface at the front end of the housing (10). The ribs (12) are formed on the outer surface at the middle of the housing (10) and are arranged at intervals. The voice-receiving hole (13) is defined through the outer surface near the front end of the housing (10). The screen (14) is mounted securely on the outer surface near the front end of the housing (10). Preferably, the screen (14) is an LCD screen. The functional buttons (15) are mounted on the outer surface at the middle of the housing (10). The threaded section (16) is defined around the outer surface at the rear end of the housing (10).

The voice sensor module (20) is mounted securely in the inner surface of the housing (10) and aligns with the voice-receiving hole (13) to receive voice commands spoken by users.

The manual input module (30) is mounted securely in the inner surface of the housing (10) and is electrically connected with the functional buttons (15) to receive manual commands conveyed through the functional buttons (15).

The measure module (40) is mounted securely in the inner surface near the front end of the housing (10) and has a laser module and an optoelectronic sensor module. The laser module is mounted in the inner surface of the housing (10) and can produce and emit a laser beam toward an object through the lens (11). The optoelectronic sensor module is mounted in the inner surface of the housing (10) and can receive the laser beam reflected from the object.

The circuit board (50) is mounted securely in the inner surface near the front end of the housing (10) and is electrically connected with the voice sensor module (20), the manual input module (30) and the measure module (40). The circuit board (50) has a first signal amplifier, a second amplifier, a laser driver IC and an LCD driver IC. The first signal amplifier is electrically connected with the voice sensor module (20). The second signal amplifier is electrically connected with the optoelectronic module. The laser driver IC is electrically connected with the laser module. The circuit board (50) is used to receive and judge commands sent from the voice sensor module (20) or the manual input module (30) to activate the measure module (40) for subsequent steps of distance determination.

The display module (60) is mounted securely in the housing (10) and is electrically connected with the screen (14) and the LCD driver IC. The display module (60) is used to show a determined result on the screen (14). Preferably, the display module (60) is an LCD display module.

The power module (70) is mounted securely in the inner surface near the rear end of the housing (10) to supply power to the voice sensor module (20), the manual input module (30), the measure module (40), the circuit board (50) and the display module (60).

The illumination module (80) is mounted securely in the rear end of the housing (10), is electrically connected with the power module (70) to provide the laser rangefinder an illumination function and has a body (81). The body (81) is hollow and is screwed with the threaded section (16) as shown in FIG. 3.

Figure 4:
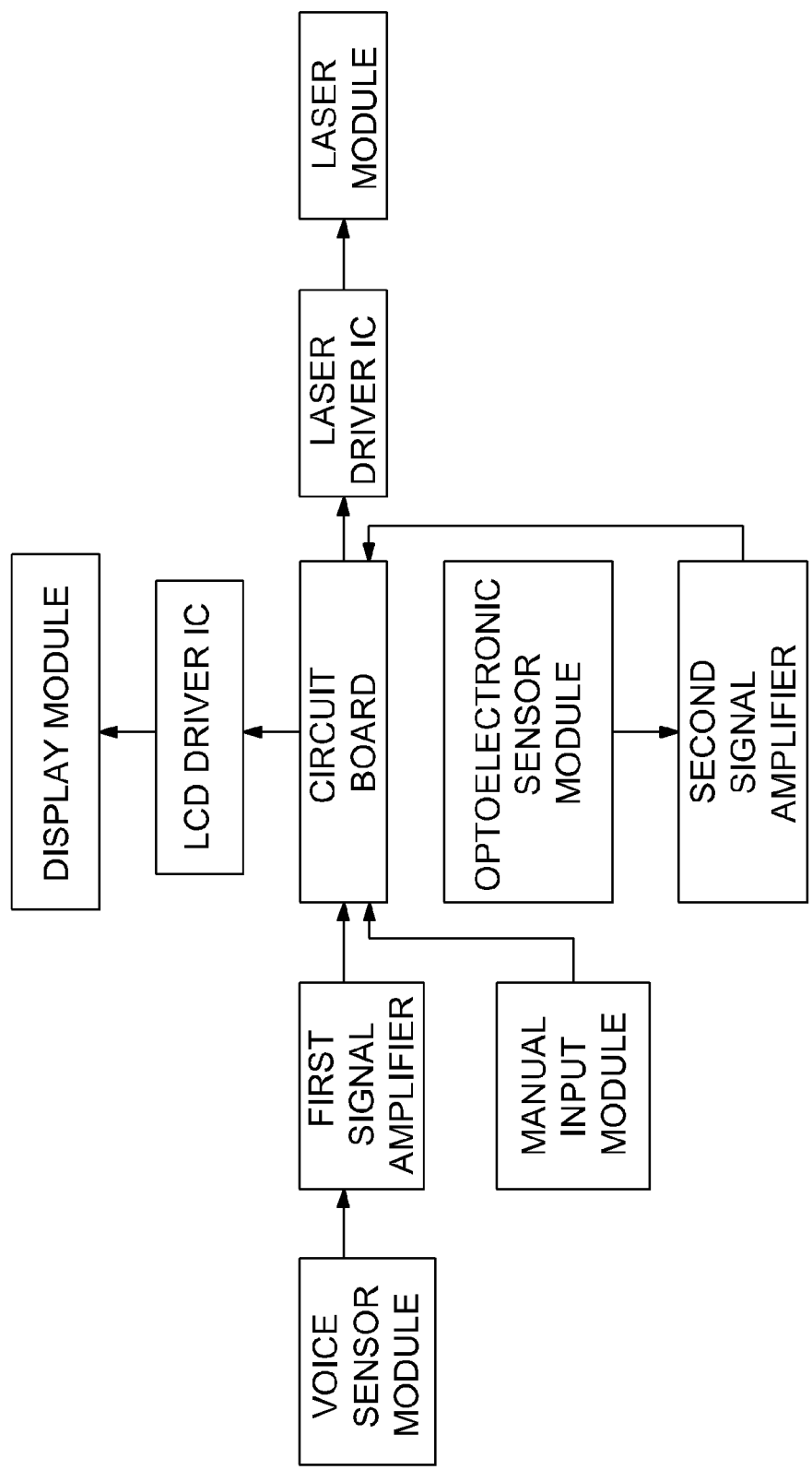
FIG. 4 is a block diagram of the laser rangefinder in FIG. 1.
Figure 5:
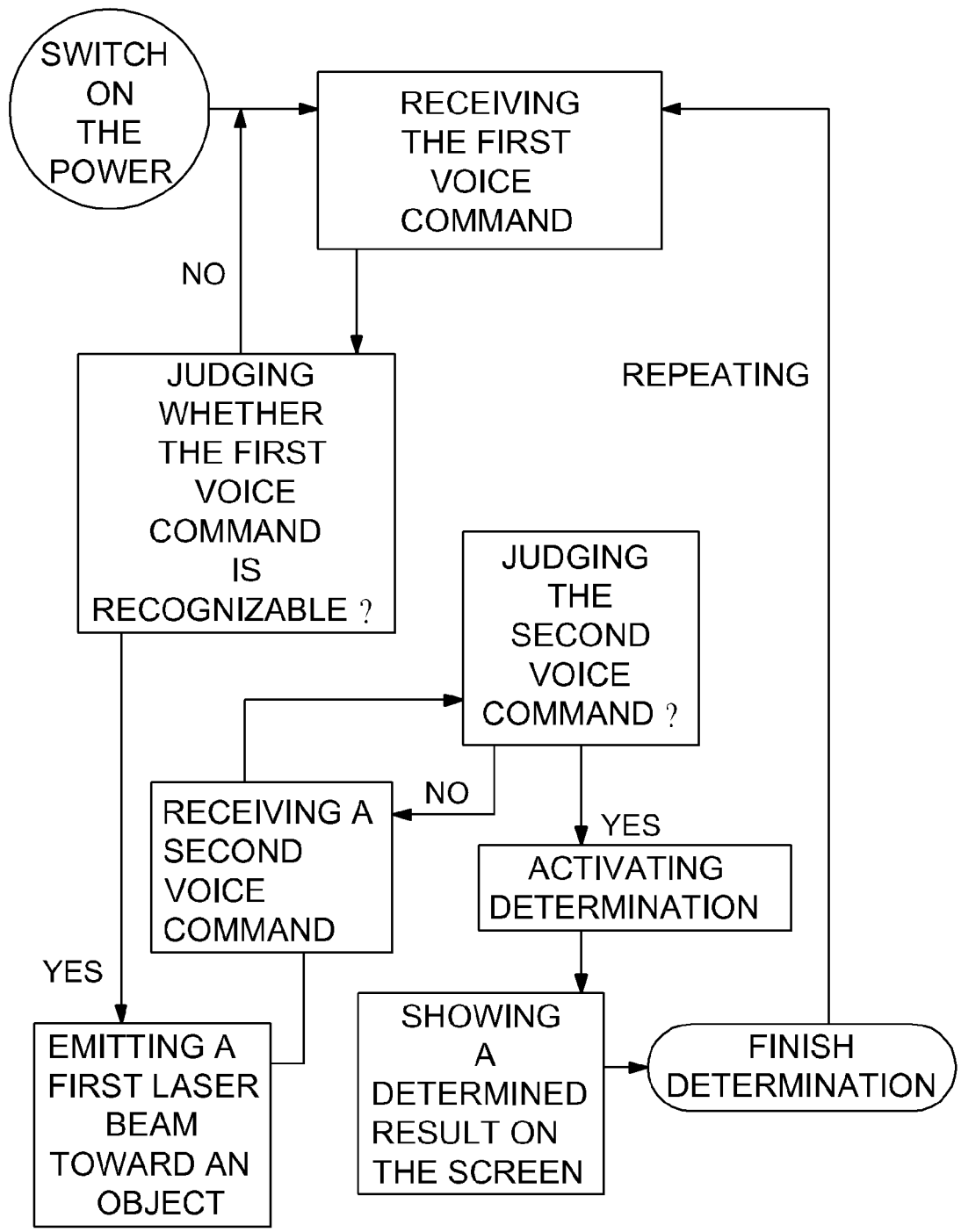
FIG. 5 is a block diagram of a method of operating the laser rangefinder in FIG. 1 in a voice control mode.

With further reference to FIGS. 4 and 5, steps of operating the laser rangefinder in a voice control mode comprise:

Step 1, switching on the power and then giving the laser rangefinder a first voice command;

Step 2, receiving the first voice command by the voice sensor module (20), amplifying the first voice command by the first signal amplifier, and sending the first voice command to the circuit board (50);

Step 3, the circuit board (50) judges whether the first voice command is recognizable and activates the laser driver IC, then the laser driver IC activates the laser module;

Step 4, emitting a first laser beam toward an object by the laser module of the measure module (40) to confirm whether the first laser beam aims at the object;

Step 5, receiving a second voice command by the voice sensor module (20), judging the second voice command by the circuit board (50) to activate the laser driver IC, activating the laser module by the laser driver IC to emit a second laser beam;

Step 6, receiving the second laser beam reflected from the object by the optoelectronic sensor module of the measure module (40), amplifying the received second laser beam by the second signal amplifier and sending to the circuit board (50);

Step 7, calculating and determining a distance between the laser rangefinder and the object based by a time interval of the second laser beam traveling toward and returning from the object; and Step 8, showing a determined result on the screen (14) with the circuit board (50) activating the LCD driver IC that activates the display module (60).

From the above description, it is noted that the invention has the following advantages:

1. High accuracy: the laser rangefinder in accordance with the present invention can be operated to determine a distance by voice commands so vibration and shake can be prevented and accuracy of the laser rangefinder improved.

2. Convenience of use in confined space: being controlled by voice commands, the laser rangefinder in accordance with the present invention can be operated in a confined or awkward space and is convenient and versatile in use.

3. Convenience of use in the dark: with the illumination module (80), an illumination function is provided to allow the laser rangefinder to be used in a dark environment.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A laser rangefinder with a voice control function comprising:
    a housing having
        an outer surface;
        an inner space;
        a middle;
        a rear end;
        a voice-receiving hole defined through the outer surface of the housing;
        a screen mounted securely on the outer surface of the housing;
        multiple functional buttons mounted on the outer surface at the middle of the housing; and
        a threaded section defined around the outer surface at the rear end of the housing;
    a voice sensor module mounted securely in the inner space of the housing and aligning with the voice-receiving hole to receive voice commands spoken by users;
    a manual input module mounted securely in the inner space of the housing, electrically connected with the functional buttons to receive manual commands conveyed through the functional buttons;
    a measure module mounted securely in the inner space of the housing and having
        a laser module mounted in the inner space of the housing to produce and to emit a laser beam toward an object; and
        an optoelectronic module mounted in the inner space of the housing to receive the laser beam reflected from the object;
    a circuit board mounted securely in the inner space of the housing, electrically connected with the voice sensor module, the manual input module and the measure module to receive and to judge the voice commands sent from the voice sensor module or manual commands sent from the manual input module, and to activate the measure module for steps of distance determination and to calculate and to determine a distance between the laser rangefinder and the object based by a time interval of the laser beam traveling toward and returning from the object;
    a display module mounted securely in the inner space of the housing, electrically connected with the screen and the circuit board to show a determined result on the screen; and
    an illumination mounted securely in the rear end of the housing to provide the laser rangefinder an illumination function and having a body screwed with the threaded section of the housing.

2. The laser rangefinder as claimed in claim 1, wherein the housing has multiple ribs formed on the outer surface at the middle of the housing.

* * * * *